Nov. 26, 1946.  C. DOERING ET AL  2,411,616
APPARATUS FOR FEEDING, CUTTING, AND MOLDING
INDIVIDUAL EDIBLE SPREADS
Filed April 7, 1941  3 Sheets-Sheet 1
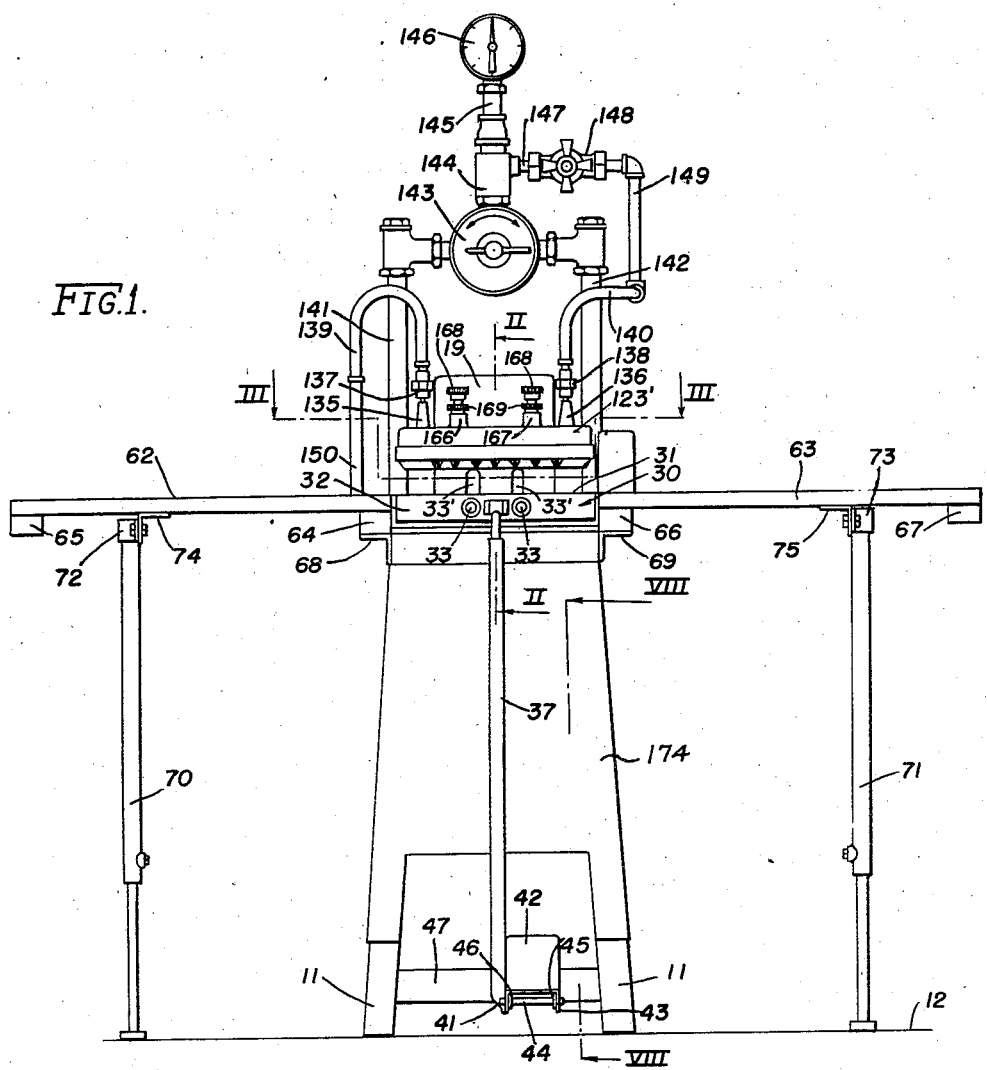
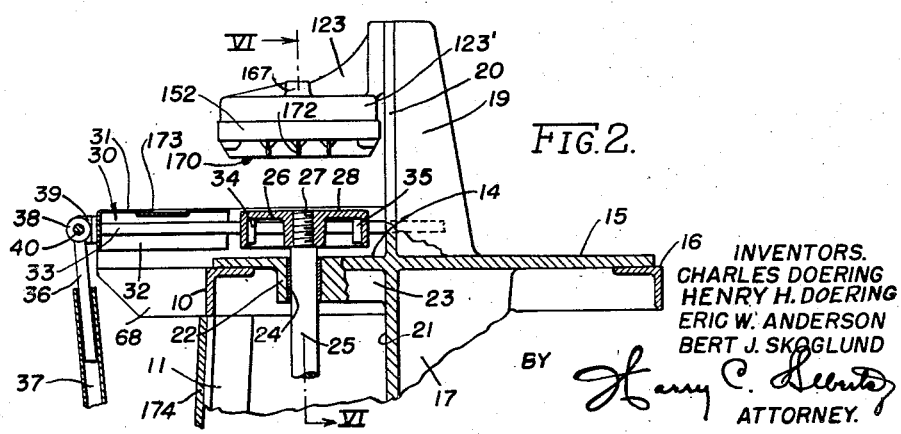
INVENTORS.
CHARLES DOERING
HENRY H. DOERING
ERIC W. ANDERSON
BERT J. SKOGLUND
BY
ATTORNEY.

Nov. 26, 1946.　　　C. DOERING ET AL　　　2,411,616
APPARATUS FOR FEEDING, CUTTING, AND MOLDING
INDIVIDUAL EDIBLE SPREADS
Filed April 7, 1941　　　3 Sheets-Sheet 2
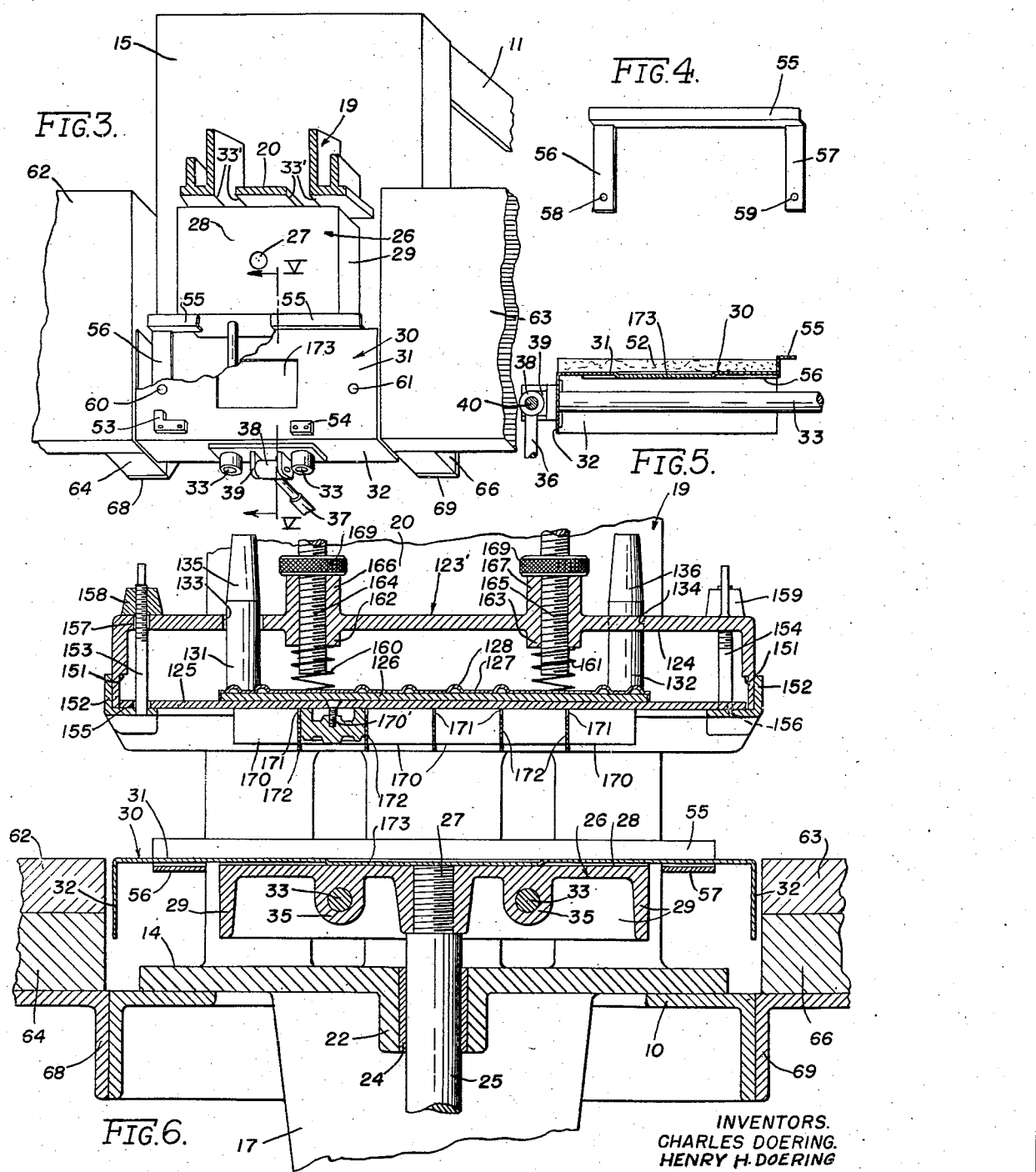
INVENTORS.
CHARLES DOERING.
HENRY H. DOERING
ERIC W. ANDERSON.
BERT J. SKOGLUND.
BY
ATTORNEY.

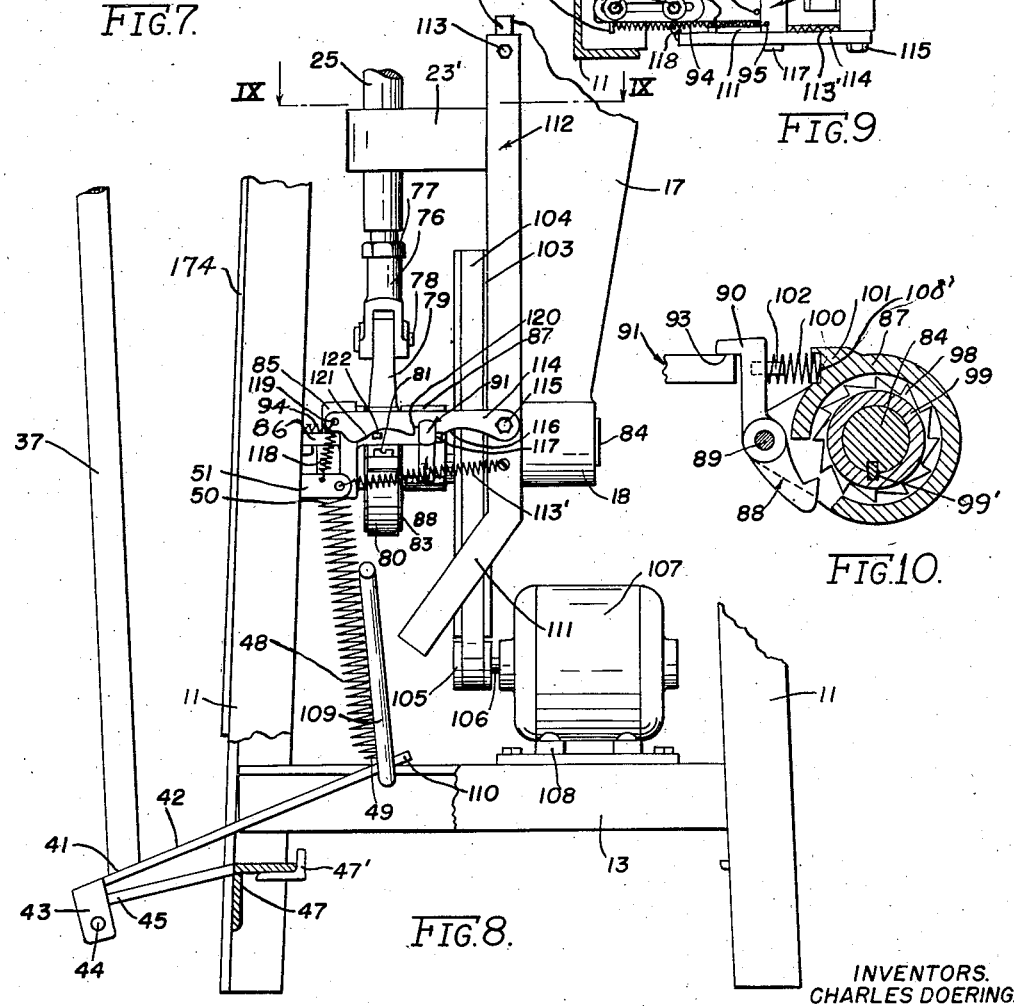

Patented Nov. 26, 1946

2,411,616

UNITED STATES PATENT OFFICE 2,411,616

APPARATUS FOR FEEDING, CUTTING, AND MOLDING INDIVIDUAL EDIBLE SPREADS

Charles Doering, Henry H. Doering, Eric W. Anderson, and Bert J. Skoglund, Chicago, Ill.; said Anderson and said Skoglund assignors to said Charles Doering and Henry H. Doering Application April 7, 1941, Serial No. 387,256

2 Claims. (Cl. 31—7)

This invention relates to molding devices and more particularly to combined cutting and molding instrumentalities for converting edible plastic slabs into polygonal units of varied surface design, although certain features thereof may be employed with equal advantage for other purposes.

It contemplates more especially the provision of molding and cutting instrumentalities combined to convert edible plastics into polygonal units in a single operation responsive to a feeding instrumentality for effecting the severance of plastic slabs into palatable segments of pleasing appearance.

It has been customary to form edible plastics such as butter and kindred edible substances into rectangular bricks of varying weights; however, these necessitated transverse and longitudinal severance with auxiliary devices to create rectangular segments primarily for restaurant purposes. This not only entails much labor in the preparation thereof for serving to the consumer, but also the contour thereof is only utilitarian, which does not enhance the appearance thereof, an important factor in pleasing the taste of the individual consumer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics are produced in accordance with the teachings of the present invention in a single operating stroke which effects substantially simultaneous severance and surface design impression, this being distinguished from the usual method of longitudinal and then transverse division of units into multiple segments of usually rectangular shape and devoid of surface design. Surface designs on such commodities are considered advantageous for restaurant purposes.

Power operation of the impressing means serves to feed the slab of substances in the path of the impressing and cutting instrumentalities to render the latter effective in the continuity of operations responsive to a single manual control. This may be in the form of a hand or pedal actuator control depending upon the dictates of commercial practice. It is important that the power instrumentalities that actuate the cutting and impression instrumentalities, be controlled to the extent of creating a single actuation for each slab of material that is presented thereto. This is controlled automatically to avoid a duplication of impressions and to insure precision as well as a maximum production by the improved combination of elements that makes possible the simultaneous power actuation of impressing and cutting instrumentalities in devices of this character.

One object of the present invention is to provide an improved combined printing and cutting mechanism that is simple in construction and operates responsive to the feeding operation.

Another object is to provide a simple feeding device for controlling the operation of instrumentalities that respond thereto to effect the formation of edible plastic slabs into a plurality of multiple segments of any selected surface design to render such more palatable and attractive.

Still another object is to provide improved power actuated means for segmenting edible plastic slabs into a multiple of associated units.

A further object is to provide a novel combination of segmenting, surface impressing, and ejecting instrumentalities automatically operative responsive to a slab feedig mechanism for conversion of edible plastic slabs into multiple segments impressed with selected surface designs thereon.

A still further object is to provide a novel combination of feeding, segmenting, surface impressing and ejecting instrumentalities combined for single stroke power operation to convert edible plastic slabs into segments having any selected surface design thereon.

Still a further object is to provide novel feeding, molding, cutting and ejecting instrumentalities in combination with thermal control means to convert edible plastic slabs into multiple segments having any selected surface designs thereon.

Other objects and advantages will appear from the following description of an illustrative embodiment of the present invention.

In the drawings:

Figure 1 is a front view in elevation of a device embodying features of the present invention.

Figure 2 is a fragmentary sectional side view in elevation taken substantially along line II—II of Figure 1.

Figure 3 is a sectional perspective view looking down on the platen or supporting table when taken substantially along line III—III of Figure 1, parts thereof being broken away to clarify the showing.

Figure 4 is a perspective plan view of the rear shoulder stop for limiting the inward positioning of the substance on the feeder plate as shown in Figure 3.

Figure 5 is a fragmentary sectional view taken substantially along line V—V of Figure 3.

Figure 6 is an enlarged fragmentary sectional view taken substantially along line VI—VI of Figure 2 with the combined molding and cutting instrumentalities in spaced relation prior to effecting the initial operation thereof.

Figure 7 is a plan view of the thermal plate element serving as a backing for the cutting and molding elements shown in Figure 6.

Figure 8 is an enlarged fragmentary sectional view taken substantially along line VIII—VIII of Figure 1 constituting a side view of the lower part of the device with portions broken away to show the power actuating mechanism for the cutting and molding instrumentalities.

Figure 9 is a sectional view of the power control instrumentalities taken substantially along line IX—IX of Figure 8.

Figure 10 is an enlarged sectional view of the power actuator control taken substantially along line X—X of Figure 9.

The structure selected for illustration comprises a horizontal frame member 10 of substantially rectangular configuration which is supported at the desired elevation by a plurality of corner standards 11, in this instance four, that preferably though not essentially comprise angle irons attached at their upper ends to the frame member 10 by welding, riveting or other suitable fastening expedients. In the present embodiment, the standards 11 are inclined to converge upwardly toward the frame member 10 in order to serve as a rigid support therefor at any desired elevation from a supporting surface such as a floor 12.

To maintain the corner standards 11 in their desired spaced relation and to rigidify the support of the frame member 10, cross members 13 constituting angle irons are welded or otherwise joined to the corner standards 11 proximate to the lower extremities thereof. This reinforces the standards and provides a durable frame for the elevated support of the frame member 10. A top plate 14 is disposed upon the frame 10 and extends rearwardly to provide an apron 15 supported by a frame extension 16 (Figure 2).

The top plate 14 with its rearwardly extending apron 15 has a depending webbed bracket 17 disposed between the rear corner standards 11 to terminate downwardly in a bearing 18 (Figure 8) to support the operating instrumentalities to be hereinafter described. Additionally the body top plate 14 with its rearwardly extending apron 15 has an upwardly extending bracket 19 that presents a vertical surface member 20 in alignment with a corresponding depending surface member 21, the former constituting a part of the upstanding bracket 19 and the latter a part of the depending bracket 17 (Figure 2).

It should be noted that the top plate 14 has a depending bearing boss 22 formed integral therewith to depend therefrom, it constituting a rigid part of the top plate 14 for reinforced support by a web 23 extending to the depending surface member 21 for integral joinder therewith. Another bearing 23' extends laterally of the depending surface member 21 for attachment thereto in spaced relation with the depending boss 22. The boss 22 depending from the top plate 14 is vertically bored to receive a bearing 24 which is pressed therein to define a guide for a correspondingly sized shaft 25 that is reciprocally mounted in bearings 23' and 24 aligned therewith. A substantially rectangular platen 26 is fixed to the upper extremity 27 of the reciprocally mounted shaft 25 for movement therewith. As shown, the rectangular platen 26 has a flat upper surface 28 and depending side walls 29 (Figure 2) that define the periphery thereof.

To enable the support and feeding of the edible slabs of plastic material, a feed and supporting member 30 is shaped to serve as a complement for the platen 26 to cooperate therewith. To this end, the feed and supporting member 30 has a flat upper surface 31 sized to slide over and confront the corresponding surface 28 of the platen 26, the former having front and side depending flanges 32 to correspond with the flanged periphery 29 of the platen 26. The slab feed and supporting member 30, in this instance, has a pair of spaced rods 33 anchored in the forward depending flange 32 (Figures 1 and 2) to project rearwardly through correspondingly bored aligned bosses 34—35 provided in the forward and rearward depending flanges 29 of the platen 26 to serve as a guide for the spaced rods 33 and the slab supporting and feeding member 30 which reciprocate relative thereto. To this end, correspondingly spaced vertical slots 33' are provided in the forward wall 20 of the upwardly extending bracket 19 (Figure 3) to accommodate the spaced rods 33 as these are displaced rearwardly relative to and upwardly with the platen 26.

This enables the feed and supporting member to receive a slab of substance in its extreme inoperative position toward the left (when viewed from Figure 2) to convey the slab to an opposite extreme operative position above the platen 26 toward the right (when viewed from Figure 2) and in direct vertical alignment therewith to place the slab in the path of impressing and cutting instrumentalities to be described hereinafter. The slab feed and supporting member 30 is movable in a horizontal plane toward and above the platen 26 and in a vertical plane therewith, by means of the telescopic association of a rod 36 with a tubular member 37.

The rod 36 has a circular boss 38 at its extremity to cooperate with a furcated lug 39 anchored to the forward depending flange 32 of the slab feed and supporting member 30. The boss 38 and furcations of the bracket 39 are bored for axial alignment to receive a pintle 40 therethrough for pivotal connection of the rod 36 with the feed and supporting member 30. The tubular member 37 extends downwardly for rigid attachment as at 41 to a pedal 42 (Figure 8). The pedal 42 has depending ears 43 through which a pintle 44 extends to pivotally connect the pedal 42 to spaced plates 45—46 attached to an angle iron cross-bar 47.

The cross-bar 47 is spot-welded or otherwise attached to the forward corner standards 11 of the frame 10 (Figures 1 and 8) and an angle member 47' or other suitable trip (Figure 8) is fixed thereto in the path of the pedal 42 to serve as a stop therefor to limit its downward displacement. It will be observed, therefore, that the actuation of the pedal 42 will cause the tubular actuator rod extension 37 to oscillate therewith and impart corresponding movement to the rod 36 which is in telescopic association therewith for sliding the slab feed and supporting member 30 toward the platen 26 until it reaches its extreme aligned position therewith. A spring 48 is anchored at one extremity 49 to the upper portion of the pedal 42 while the other spring extremity 50 is anchored to a lug 51 attached to one of the forward corner standards 11 (Figure 8).

The spring 48 thus rotates the pedal 42 in a counterclockwise direction (viewed from Figure 8) to be returned to its initial position together with the slab feed and supporting member 30 that is operatively connected therewith. In order to maintain a slab of plastic material such as butter 52 in the desired position on the feed member surface 31 and to serve as an indexing expedient therefor, a substantially L-shaped member 53 is attached thereto for support proximate to the forward and side wall thereof. A substantially rectangular lug 54 is also attached to the feed member surface 31 in lateral alignment with the L-shaped indexing member 53 in order to insure against angular misplacement with respect to the impressing and cutting instrumentalities to be hereinafter described (Figure 3).

Then, too, the rearward edge of the feed member surface 31 is provided with an upstanding shoulder comprising an angular member 55 having attaching arms 56—57 projecting therefrom to contact the underside of the feed member 30. To this end, the arms 56—57 may be attached to the underside of the feed member 30 by spot-welding or resort to fastening expedients that project through aligned apertures 58—59 and 60—61 provided in the shoulder arms 56—57 and feed member 30, respectively. In the event fasteners are employed for this purpose, they should be of a type to avoid obstruction to the upper feed member surface 31.

With this arrangement, it will be apparent that the plastic slabs 52 will be confined to a definite position upon the feed member 30 to accurately receive the desired impression and simultaneous segmentation as will appear more fully hereinafter. In order to provide for the convenient handling of the slabs 52 before and after being subjected to the simultaneous impressing and segmenting operation, rectangular table members 62—63 are supported adjacent the platen 26 and feed member 30 to extend laterally from both side edges thereof. The table members 62—63 have depending shoulders 64—65 and 66—67 attached to their peripheral side edges.

The shoulders 64—65 and 66—67 comprise strips of suitable material attached to the underside of the table members 62—63, the shoulders 65 and 67 being at the left and right of the edges of the table members 62—63, respectively, and the shoulders 64 and 66 being fastened to the inner edges of the table members 62—63 near the platen 26 and supported on angle irons 68—69 attached to the upper end of the frame member 10 (Figure 1). Extensible legs 70—71 are attached by clamps 72—73 to brackets 74—75 fixed to the inside of the table members 62—63 at points spaced from the angle irons 68—69 in order to maintain the table members 62—63 in the desired horizontal plane. This affords a substantial working surface for handling and other operations preparatory to and after the slabs 52 are removed from the member 26.

It is to be noted that the plastic material 52 is first cut or otherwise shaped into preformed rectangular slabs of uniform size so that the guide and indexing expedients 53—54—55 will serve as a position indicator therefor on the flat feed member surface 31. It is preferable though not essential that the edible plastic slabs 52 be deposited on a sanitary liner of parchment or other suitably processed paper adaptable for that purpose, thereby precluding the plastic slabs 52 from directly contacting the upper feed member surface 31 which serves as a support for the material 52 preferably with a liner therebetween. The preparation of the slabs 52 is fully disclosed in copending application Serial Number 269,297 and filed April 21, 1939, which has eventuated into Letters Patent No. 2,321,188, dated June 8, 1943, but such may be accomplished in other ways depending upon the dictates of commercial practice.

In order to enable the vertical reciprocation of the platen 26 together with the feed member 30, the platen supporting shaft 25 terminates at its lower end in a furcated coupler 76 which is joined thereto by means of a threaded reduced end on the shaft 25 screwed into a drilled and threaded hole in the coupler 76, the shaft being provided with a lock nut 77. The coupler 76 is attached by pivot 78 to a connecting rod 79, which has a split clamping bearing holder comprising a semicircular cavity in the connecting rod 79 and the cap 80. A bearing is held in the bearing holder and rotatably holds the eccentric disk 83 which is rotatably mounted on the eccentric shaft 84. The shaft 84 is journaled at one extremity in the bearing 18 which confronts another end bearing 85 supported by a bracket 86 anchored to one of the four corner standards 11. The eccentric shaft 84 has a clutch housing 87 rotatably mounted thereon and fixed to the eccentric disk 83 for rotation therewith. A ratchet wheel 99 is fixed to the shaft 84 and is intended to rotate continuously during the operation of the machine.

The clutch housing 87 and the attached eccentric disk 83 are adapted to be rotated by the shaft 84 when the latching mechanism hereinafter described is released. To this end, the clutch housing 87 is provided with a pawl 88 that is pivoted thereto as at 89 to present an offset lever arm 90 in the path of a trip 91. The trip 91 is horizontally pivoted to the bracket 86 by means of a pivot pin 92 (Figure 9) to present the trip extremity 93 in the path of the offset lever 90 constituting a part of the pawl 88 a rectangular stop 91' is fixed to the bracket 86 in the path of the trip 91 to serve as a stop therefor. A coil spring 94 is anchored as at 95 to the trip 91 to impart an urge thereto in a clockwise direction (viewed from Figure 9) and the other extremity of spring 94 is anchored to a bracket 96' by means of a rib or projection 96 projecting therefrom. The bracket 96 is adjustably mounted on bolts 96'' as a take-up on the end bearing 85 and secondarily to adjust the tension on the spring 94. A limit pin 97 is also anchored in the bracket 86 to serve as a stop against which the spring 94 moves the trip 91 so that its extremity 93 is normally disposed directly in the path of the offset arm 90. The pawl 88 is pivotally mounted to confront circumferentially disposed teeth 98 comprising a part of the ratchet wheel 99 which is keyed as at 99' to the shaft 84 for rotation therewith.

A spring 100 is interposed between the pawl arm 90 and a countersunk lug 101 formed on the clutch housing 87 to normally urge the pawl 88 in engagement with the ratchet teeth 98. A pin 102 preferably projects from the pawl arm 90 to maintain the spring 100 in a recess 100' provided in the lug 101 formed on the clutch housing 87. It will be observed, therefore, that when the trip 93 is in its normal position, it will engage beneath the pawl offset arm 90 and displace the pawl 88 from engagement with the ratchet teeth 98, thereby permitting the shaft 84 to idle responsive to the rotation of a comparatively large pulley 103 driven by a belt 104 that engages a driving pulley 105.

The driving pulley 105 is fixed to an armature or rotor shaft 106 of an electric motor 107. The electric motor 107 has a base 108 which enables attachment thereof to the cross members 13 supported by the corner standards 11 (Figure 8). It will be observed, therefore, that rotation of the pulley 103 responsive to the motor 107 will normally impart rotation to the eccentric shaft 84 without actuating the eccentric 83. The eccentric 83 is rotated only when the pawl 88 engages its teeth 98, and this is controlled by the pedal 42 having an upstanding trip 109 fixed to the upper extremity 110 thereof. The trip 109 is so postioned as to engage an offset extremity 111 of a lever 112 which is pivoted as at 113 to the web 21 of the lower frame bracket 17.

The lever 112 is normally urged to its extreme clockwise position (viewed from Figure 8) by a spring 113' that is connected therewith for anchored attachment to the frame bracket 51, thereby tending to return the lever 112 to its initial inoperative position. The lever 112 has a cross lever 114 pivoted thereto as at 115 to present a curved edge 116 that engages a reduced extremity 117 of the trip 91 (Figures 8 and 9). The cross lever 114 is normally urged in a counter-clockwise direction (viewed from Figure 8) by means of a spring 118 anchored to the free extremity 119 thereof. To this end, the other extremity of the spring 118 is fixed to the corner standard bracket 51 (Figure 8) to effect registry between a notch 120 in the curved edge 116 of the cross lever 114 and the trip 91.

It will be observed, therefore, that the actuation of the pedal 42 will first cause the feed member 30 to move over the platen 26 and, thereupon, the latter will be in vertical alignment with the frame. Whereupon the trip 109 will engage the offset extremity 111 of the lever 112 so that further depression of the pedal 42 will actuate the cross lever 114 to move the trip 91 toward the right (viewed from Figure 9.) This will enable the lever pawl 88 to pivot in a counterclockwise direction (viewed from Figure 10) under the urge of the spring 100 to cause the rotation of the cam 82 which, in turn, elevates and then lowers the connecting rod 79 together with the platen shaft 25 responsive to a full revolution.

It should be noted that the trip 91 immediately returns to its initial position responsive to the urge of the spring 94 so that when the offset pawl arm 90 again reaches the path of the extremity 93 of the trip 91, it will be disengaged to preclude more than a single complete reciprocation of the platen shaft 25. This is true even though the pedal 42 is maintained depressed by the attendant, because the cross lever 114 has an eccentric projection 121 which cooperates in the manner of a cam with a lug 122 fixed to the bracket 86 so as to raise the cross lever 114 as the lever moves the end 117 of the trip 91 to the right (as viewed in Figure 8) and thus to release the end 117 from the left side of the notch 120 and to permit the trip 91 to return to its normal position under the tension of the spring 94. When the cross lever 114 is in its intermediate position, the trip 91 cannot engage the pawl offset arm 93 of the pawl 90 to effect its displacement from engagement with the ratchet teeth 98.

Irrespective of whether or not the operator removes his foot from the pedal 42, it will be apparent that the eccentric shaft 84 will only rotate one full revolution to cause a single elevation of the platen 26 with its feed member 30 until the operator removes his foot from the pedal 42 and repeats the operation. When the operator has removed his foot from the pedal 42, the latter returns to its initial position and the feed member 30 will also return to its inoperative position (Figure 2) and permit placement of another slab of plastic material 52 thereon.

In order to support cutting, molding and ejecting instrumentalities in the path of the platen surface 26, the upper frame bracket 19 with its surface member 20, is provided with an angle bracket 123 that is attached thereto to provide a downwardly flanged die and cutter holder 123' (Figures 2 and 6). The holder 123' provides a downwardly open rectangular housing 124 suspended from the angle bracket 123 in confronting relation with the platen 26 and feed member 30 when the latter is over the platen 26. The housing 124 is shaped and sized to correspond substantially with the feed member 30, the former serving as a retainer and guide for a plate 125 shaped to conform with the interior of the housing 124 for displacement through the lower open end thereof.

The plate 125 is, in this instance, of rectangular configuration to receive a smaller plate 126 which is covered by a flanged plate cover 127 brazed or otherwise joined therewith. The plate cover 127 is impressed with circuitous troughs 128 (Figures 6 and 7) to confront the plate 126 and define sinuous passages therewith. A thermal medium such as hot water is circulated through the passages 128 to control the temperature of the plates 125—126. To this end, inlet and outlet orifices 129 and 130 in the plate cover 127 communicate with the extremities of the passages 128.

The upstanding conduits 131 and 132 extend from the inlet and outlet orifices 129—130 (Figures 6 and 7) to freely project through apertures 133 and 134 provided in the die and cutter holder 123'. The conduits 131—132 are provided with tapered extremities 135—136 for operative connection of couplers 137—138 which, in turn, communicate with flexible hoses 139—140 attached thereto (Figure 1).

In order to control the temperature of the plate cover 127, the plates 125—126 the dies 170 and the cutter blades 172 in contact therewith for thermal conduction thereto, hot and cold water supply pipes 141—142 extend upwardly from the frame apron 15 for interconnection by a thermostat control mixing valve 143 of standard construction. The mixing valve 143 communicates with a common discharge pipe 144 that is reduced by an extension 145 to receive a temperature indicator 146 operatively connected thereto for support thereon in full vision of the attendant.

As shown, the common discharge pipe 144 has a nipple 147 connected thereto for threaded engagement with the hand valve 148. The hand valve 148 extends into a supply pipe 149 that communicates with the flexible hose 140 suitably connected therewith to supply any suitable thermal medium such as temperature controlled water into the passages 128 of the plate cover 127. The outlet flexible hose 139 communicates with a pipe 150 that is also fixed to the frame apron 15 so that a suitable extension can be connected thereto for discharge of the water to a sewer or reservoir for recirculation depending upon the dictates of commercial practice.

It should be appreciated that the water supply pipes 141—142 can be suitably connected from the frame apron 15 to a suitable source of supply. In this manner, the plates 125—126 are maintained at proper temperature best suited for the cutting and impressing of plastic substances from the slab or slabs 52. It should be noted that the flexible conduits 139 and 140 are sufficiently long to permit the plates 125—126—127 to move as a unit relative to the die and cutter holder 123 within the limits of its chambered depth and to afford this freedom of movement their connecting pipes 131—132 project freely through the somewhat larger openings 133 and 134 provided through the top surface of the downwardly flanged holder 123'.

As shown, the plate 125 with its superposed elements 126—127—131—132 is limited in its vertical movement upwardly by a peripheral shoulder 151 (Figure 6) provided in the depending sides of the holder 123'. Its vertical movement downwardly is limited by the right-angled rectangular cutter frame 152 that telescopes over the lower peripheral edge of the die and cutter holder 123' for rigid attachment thereto by threaded studs 153 and 154 projecting upwardly therefrom through apertures 155—156 in the die supporting plate 125 which has tolerance of vertical movement relative thereto. The threaded studs 153—154 extend through apertures 157 provided in the top of the housing 124 of the die and cutter holder 123' for threaded attachment of wing nuts 158—159 thereto, thereby enabling the secure attachement of the cutter frame thereto.

It is to be noted that the die holder plate 125 is normally urged downwardly to its lower limit so that it engages the frame 152, this being effected by compression coil springs 160 and 161 which are interposed between depending bosses 162—163 in the top of the housing 124 of the holder 123' and the corresponding confronting wall of the thermal control plate 126—127, the impressing dies 170, and the cutter blades 172. So that the upward limit of displacement of the thermal control plate 126—127 within the holder 123' may be adjusted to meet the requirements, threaded studs 164 and 165 project through the correspondingly threaded depending bosses 162—163 and externally upstanding aligned bosses 166—167 formed on the upper wall of the housing 124 of the holder 123' to project therein for axial alignment with the springs 160—161, respectively. To this end, the threaded studs 164—165 have their lower extremities projecting beyond the lower ends of the bosses 162—163 which bear against the springs 160—161. The studs 164—165 project through the upper ends of the springs 160—161 for retaining them in proper alignment. The studs 164—165 have knurled turning knobs 168 on their upper external extremities and knurled lock-nuts 169 to engage the bosses 166—167 to hold the studs 164—165 in adjusted position to serve as adjustable stops for the plates 125—126. The springs 160—161 will, therefore, normally urge the die holder plate 125 in its extreme downward position.

As shown, the lower downward surface of the plate 125 has a plurality of individual molding dies 170 that are uniformly spaced over the surface extent of the plate 125 to depend therefrom. The dies 170 have suitable indicia or designs in the face thereof to impart corresponding impressions to the slabs 52. The molding dies 170 are detachably connected to the plate 125 for support therefrom by means of suitable fastener screws 170' that extend therethrough to threadedly engage the molding dies 170, thereby securing them in the desired aligned and spaced relation.

Any suitable configuration or design impression may be provided on the dies 170 to impress a corresponding surface design on individual dabs or segments of an edible plastic slab 52 such as butter. It is preferable though not essential that each of the impressions formed on the dies 170 should possess more depth and extend beyond the peripheral shoulder design ridge formed on each of the impression dies 170 in order to define and impress a peripheral shoulder on the resulting edible dab or segment as fully disclosed in copending application serially numbered 264,412 and filed March 27, 1939, which eventuated into Letters Patent No. 2,323,523 issued July 6, 1943.

This assists in forming an enclosure to collect and compress the air that is caught in between the plastic dab and its respective molding die 170, thereby serving to subject such to pressure which prevents an adhesive joinder between the molding dies 170 and the individual dabs. In short, the compressed air that is trapped in each substance dab during the molding thereof, assists in the ejection and severance between the molding die 170 and the substance dab that has surface impression therewith.

It is to be noted that the plurality of molding dies 170 are arranged on the plate 125 to present linear intersecting spaces 171 therebetween to permit and provide room for a plurality of intersecting and transversely disposed cutting blades 172 rigidly fixed to the cutter frame 152. The intersecting cutting blades 172 are provided with complemental slits therebetween or are interslitted to define rectangular openings therebetween to freely receive the molding dies 170 therein without presenting any obstruction thereto. The intersecting cutting blades 172 bridge the flanged frame 152 for attachment thereto in order to constitute an integral and unitary cutter for the plastic slabs 52 of a size corresponding to the interior size of the cutter frame 152.

The cutter frame 152 is fixed to the housing 123' for retention thereon by the wing nuts 158—159 that threadedly engage the studs 153—154. Consequently, the wing nuts 158—159 will retain the cutter frame 152 in fixed relation with the housing 123' to constitute the lower end surface thereof. It will be apparent that the molding die supporting plate 125 is maintained in assembled relation with the housing 123' against accidental removal therefrom by the cutter frame 152 that serves as a downward limit therefor. This is possible without precluding or obstructing the inward movement of the plate 125 with its individual dies 170 during the impression and cutting operation that will be described more fully hereinafter.

Now, then, the dies 170 with their supporting plate 125 reciprocate relative to the cutters 172 and their frame 152. The downward displacement of the pedal member 42 will displace the feed member 30 over the platen 26. Then the platen 26 will ascend with the feed member 30 having a slab 52 thereon. The cutter blades 172 will project through the plastic slab 52 to effect the severance thereof into a multiple or plurality of segments and simultaneously elevate the dies 170 relative thereto (Figure 6) in that the springs 160—161 will yield until they are fully compressed. Thereupon, the further elevated upward displacement of the platen 26 will cause the individual dies 170 to impress the individual plastic segments to impart the desired shoulder thereto and impress corresponding surface designs constituting a complement of the mold design on each die 170.

Inasmuch as the central area of the slab 52 would ordinarily be under greater pressure than the surrounding edge region so that uniform impressions would not be possible throughout the slab 52, it has been found desirable to compensate therefor by providing a depressed rectangular central region 173 in the feed member 30. The extent of the depressed region 173 depends upon the size of the slab 52 and the variations caused therein by the flow of the substance during the impression and cutting operations.

During the impression operation, the air that was trapped between the molding dies 170 and the segments cut from the slabs 52, will be subjected to increased pressure tending to reduce the air volume. The peripheral shoulder on the moulding dies 170 serves to trap the compressed air in the centrally counter-impressed region or area of each segment. This coupled with the simultaneous compression of the springs 160—161 imparts increased energy thereto, thereby serving as combined ejecting expedients for the segments as the pedal member 42 is actuated, the impression has been effected, and the platen 26 assumes its initial position relative to the cutter blade 172. The surface impressed and segmented butter dabs will then be retained upon a paper liner with which the slab 52 is deposited on the feed member 30 that recedes from under the dies 170 and cutter 172 at the end of each revolution of operation of the clutch mechanism 87.

This relative displacement between the molding dies 170 and cutter blades 172 provides automatic ejection and the air compressed between the dies 170 and the plastic slab 52, serves to preclude sticking or adhesion therebetween that would be highly undesirable. It should be noted that in the elevation of the platen 26 and the feed member 30 responsive to the actuation of the pedal 42, the cooperative relation thereof with the edges of the intersecting blades 172 can be such as to preclude direct contact therebetween and cause their approach within a minute separated distance of not more than 1/64 of an inch. This precludes cutting entirely through the paper liner with which the slab 52 is manipulated so that it may serve as the handling medium for the segments cut therefrom.

Then, too, the strike or reciprocation of the platen 26 may be such to even avoid cutting entirely through the plastic slabs 52 so that there is a minute body or connecting mass below the intersecting cutting or stroke lines effected by the cutter blades 172 to maintain the readily separable continuity therebetween. This will provide a plurality of adhering segments which can be successively separated by resort to a butter knife or other utensil commonly employed in their serving. It will be apparent, therefore, that the plastic slabs 52 may be converted into a great variety of segments of varying shapes and surface impressions depending upon the dictates of commercial practice and the requirements of any particular customer.

Impression of surface designs such as monograms, names, insignia or other surface designs can be accomplished without resort to any additional steps in the operation of the device so that there is no increase in cost beyond that required to effect the severance of the plastic slabs 52 into a plurality of segments of the desired size, configuration and shape. Since combined cutting, molding and ejecting instrumentalities have been provided in the holder housing 123' that comes down upon the upper surface 31, the attendant is not required to perform any operation other than positioning the initial plastic slab 52 on the feed surface 31 by resort to the guide 53—54 and thereupon depressing the pedal member 42 to elevate the platen 26 in engagement with the housing 123' having its lower end provided with the forming dies 170 and cutter frame 171. Further elevation of the platen 26 effects displacement between the slab 52 and forming dies 170 together with the cutter 171 until the springs 160—161 are compressed to serve as ejecting instrumentalities as described herein.

It will thus be apparent that very simple, inexpensive and highly efficient butter or other edible plastic cutting, molding, and ejecting instrumentalities have been combined for operation responsive to a single movement imparted by an actuator such as the pedal 42. Then, too, the molding dies 170 are detachable either individually or through their plate 125 to render cleaning possible without entailing any appreciable time and to substitute dies for affording a wide range of surface impressions to be imparted to plastic slabs such as butter and the like. Cover plates 174 are fitted for attachment to the corner standards 11 to conceal the operating instrumentalities.

Various changes may be made in the embodiment of the invention herein specifically described without departing from the invention or sacrificing any of the advantages or features thereof and nothing herein shall be construed as limitations upon the invention, its concept or structural embodiment as to the whole or any part thereof except as defined in the appended claims.

We claim:

1. In a device of the character described, the combination with a supporting member, of die supporting plate means associated with said supporting member, a plurality of uniformly spaced dies detachably secured to said supporting plate, cutting blades interposed between said spaced dies, said cutting blades and die supporting plate means being mounted for movement relative to each other on said supporting member, a platen movably mounted relative to said supporting member, means for displacing said platen relative to said supporting member, a feeding plate mounted for movement relative to said platen, said feeding plate having a depressed area to compensate for variations in the resulting thicknesses of the material segmented responsive to the operation of said cutting blades and impressing dies thereon, and means for displacing said feeding plate into vertical alignment with said platen for reciprocation therewith.

2. In a device of the character described, the combination with a supporting member, of die supporting plate means associated with said supporting member, a plurality of uniformly spaced dies detachably secured to said supporting plate, cutting blades interposed between said spaced dies, said cutting blades and die supporting plate means being mounted for movement relative to each other on said supporting member, a platen movably mounted relative to said supporting member, a feeding plate mounted for movement relative to said platen, said feeding plate having a depressed area to compensate for variations in the resulting thicknesses of the material segmented responsive to said cutting blades and impressing dies, means for displacing said feeding plate into vertical alignment with said platen for reciprocation therewith, and means for simultaneously actuating said feed plate and platen so that they are synchronously displaced to feed plastic substances to said dies and cutting means.

CHARLES DOERING.
HENRY H. DOERING.
BERT J. SKOGLUND.
ERIC W. ANDERSON.